(12) United States Patent
Mochizuki et al.

(10) Patent No.: US 6,737,493 B2
(45) Date of Patent: May 18, 2004

(54) BIOCOMPATIBLE MATERIAL

(75) Inventors: Akira Mochizuki, Kanagawa (JP); Kenichi Shimura, Kanagawa (JP); Takao Anzai, Kanagawa (JP); Kazushige Ishiura, Osaka (JP); Kenichi Hamada, Ibaraki (JP)

(73) Assignees: Terumo Kabushiki Kaisha, Tokyo (JP); Kuraray Co., Ltd., Okayama (JP)

( * ) Notice: Subject to any disclaimer, the term of this patent is extended or adjusted under 35 U.S.C. 154(b) by 83 days.

(21) Appl. No.: 10/131,072

(22) Filed: Apr. 25, 2002

(65) Prior Publication Data

US 2002/0183472 A1 Dec. 5, 2002

(30) Foreign Application Priority Data

Apr. 25, 2001 (JP) ........................................ 2001-127285

(51) Int. Cl.[7] .............................................. C08F 118/00
(52) U.S. Cl. ........................ 526/320; 526/226; 526/328; 526/332
(58) Field of Search ................................ 526/226, 320, 526/328, 332

(56) References Cited

U.S. PATENT DOCUMENTS

| 4,293,674 | A | * | 10/1981 | Andrews | ..................... 526/327 |
| 4,357,435 | A | * | 11/1982 | Lewis et al. | ................. 524/239 |
| 4,522,990 | A | * | 6/1985 | Andrews | ..................... 526/180 |
| 2003/0028073 | A1 | * | 2/2003 | Mochizuki et al. | ........... 600/16 |

* cited by examiner

*Primary Examiner*—Helen L. Pezzuto
(74) *Attorney, Agent, or Firm*—Burns, Doane, Swecker & Mathis, LLP

(57) ABSTRACT

To provide a biocompatible material with a high level of safety at a low cost. The biocompatible material has a polymer synthesized from monomers by an anionic polymerization, wherein the polymer has a ratio (Mw/Mn) of a weight-average molecular weight (Mw) to a number-average molecular weight (Mn) in a range of 1.0 to 1.5, in which the weight-average molecular weight is 40,000 or more, and each of the monomers is represented by a following general formula (1):

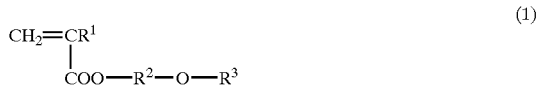

(1)

where $R^1$ is a hydrogen atom or a methyl group; $R^2$ is a $C_1$–$C_4$ alkylene group; and $R^3$ is a $C_1$–$C_4$ alkyl group.

6 Claims, No Drawings

BIOCOMPATIBLE MATERIAL

BACKGROUND OF THE INVENTION

1. Field of the Invention

The present invention relates to a biocompatible material and a method of manufacturing the same. More specifically, the present invention relates to a biocompatible material, which is usable in a medical apparatus to be contact with blood or any tissue in a living body, and a method of manufacturing such a biocompatible material.

2. Description of the Related Art

In these years, various kinds of medical apparatuses comprised of polymeric materials have been developed and practically used in many fields. For instance, the medical apparatuses include artificial kidneys, oxygenator, plasma-separating films, catheters, artificial blood vessels, artificial joints, artificial skins, and the like. An artificial polymer would be recognized as a foreign substance in the body, causing various kinds of biological defense mechanisms, which are undesirable for living bodies. Therefore, it has been expected to develop a novel material that makes no biological defense reaction. In other words, it has been expected so far to have an excellent biocompatibility or an excellent blood compatibility. In the present situation, it is known that a material having a micro-phase separation structure in which a hydrophilic phase and a hydrophobic phase are separated from one another shows an excellent blood compatibility, especially an excellent blood-platelet compatibility. However, the application of such a material is restricted because such a phase separation with certain dimensions should be generated and the conditions for adjusting such a structure are restricted within their respective narrow ranges. Furthermore, there is another finding in which the blood-platelet compatibility can be expressed by applying a hydro gel such as polyethylene glycol on the surface of the material. However, such a compatibility lasts only a short time, so it can be difficult to keep the compatibility for the long term. Furthermore, it is also known that blood platelets adhere remarkably to the surface of a hydrophobic material made of polypropylene, polyethylene terephthalate, or the like, resulting in the activation of each blood platelet.

In the blood compatibility, with respect to the compatibility to a complement system, significant complement-activating abilities can be found in cellulose, ethylene/vinylalcohol copolymer, and the like. It is known that hydroxyl groups in these polymeric materials cause such an activation. In contrast, it is also known that a hydrophobic material such as polypropylene has a less complement-activating ability (The Journal of Artificial Organs, 16 (2), 1045–1050, 1987).

In JP 04-152952A, polyalkoxyalkyl (meth)acrylate is disclosed as a material that keeps its blood-platelet compatibility, anti-complement activity, and ease of surface modification in balance.

From a view point of maintaining safety, for making this material fit for practical use, a polymer in low molecular weight region of the polymer should be completely removed from the entire material by means of repeated fractional precipitations to prevent any undesired substance of this material from eluting into the blood. Under present circumstances, therefore, the resulting product becomes very expensive.

This can be explained as follows. That is, an alkoxyalkyl (meth)acrylate and its copolymer have one or more alkoxyl groups, so that it has a comparatively high hydrophilicity. Therefore, it becomes water-soluble as its molecular weight becomes smaller. If the polymer is synthesized by means of radical polymerization, its polymerization mechanism would be destined to be resulted in a comparatively wide molecular weight distribution. In other words, it is inevitable that a ratio (Mw/Mn) of dividing the weight-average molecular weight (Mw) by the number-average molecular weight (Mn) will be obtained as a value of 2 to 3 in general. This means a lot of low molecular weight polymer components are included in the resulting polymeric material and impart slight water solubility to the polymeric material. Therefore, if such a polymeric material is directly used as a biocompatible material, there is a fear of causing low molecular weight polymer components to elute into the blood.

For solving this problem, heretofore, synthesized polymers have been put in to practical use after removing low molecular weight polymer components from them by subjecting to repeated cycles of washing and re-precipitation. In this case, each of steps of washing and re-precipitation requires a large quantity of an organic solvent such as hexane or ether, which is expensive and is also exceedingly volatile and flammable. Therefore, it is inevitable that the resulting polymer will be an extremely high cost product. In addition, the use of these organic solvents leads to extremely low working properties. Furthermore, there is another problem in that the evaporated solvent has a deleterious effect on the environment.

SUMMARY OF THE INVENTION

The present invention has been made in view of the above-mentioned problem and it is an object of the present invention to provide a much safer biocompatible medical material at low cost. Specifically, an object of the present invention is to provide a polyalkoxyalkyl (meth)acrylate based biocompatible material at a low price.

The present inventors have paid their attention on anionic polymerization and found that a copolymer with a homopolymer composed of alkoxyalkyl (meth)acrylates that a ratio (Mw/Mn) of a weight-average molecular weight (Mw) to a number-average molecular weight (Mn) is 1 to 1.5, and also weight-average molecular weight (Mw) of 40,000 or more or a copolymer composed of alkoxyalkyl (meth)acrylates and other polymers would result in a substantially water-insoluble polymer. As a result, the present invention has been completed. In other words, the present invention can be attained by the following.

A first aspect of the present invention relates to a biocompatible material comprising a polymer synthesized from monomers by an anionic polymerization, wherein the

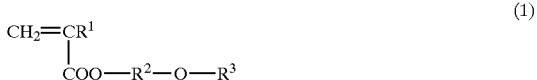

polymer has a ratio (Mw/Mn) of a weight-average molecular weight (Mw) to a number-average molecular weight (Mn) in the range of 1.0 to 1.5, in which the weight-average molecular weight is 40,000 or more, and each of the monomers is represented by the following general formula (1):

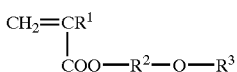

where $R^1$ is a hydrogen atom or a methyl group; $R^2$ is a $C_1$–$C_4$ alkylene group; and $R^3$ is a $C_1$–$C_4$ alkyl group.

In the biocompatible material according to the present invention, it is preferable that, in the polymerization system, the anionic polymerization proceeds in the presence of a tertiary organic aluminum compound having the structure represented by the following general formula (2):

where Ar is an aromatic ring.

In the biocompatible material of the present invention, it is preferable that $R^1$ is a hydrogen atom, $R^2$ is an ethylene group, and $R^3$ is a methyl group in the above-mentioned general formula (1).

A second aspect of the present invention relates to a method of obtaining a polymer, including performing an anionic polymerization of monomers to obtain a polymer having the ratio (Mw/Mn) of a weight-average molecular weight (Mw) to a number-average molecular weight (Mn) in the range of 1.0 to 1.5, in which the weight-average molecular weight is 40,000 or more, each of the monomers being represented by the following general formula (1):

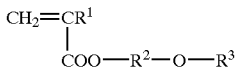

where $R^1$ is a hydrogen atom or a methyl group; $R^2$ is a $C_1$–$C_4$ alkylene group; and $R^3$ is a $C_1$–$C_4$ alkyl group.

A third aspect of the present invention relates to a polyalkoxyalkyl (meth)acrylate, which is polymerized by an anionic polymerization and is substantially free of a water-soluble component.

DETAILED DESCRIPTION OF THE PREFERRED EMBODIMENT

Hereinafter, a biocompatible material of the present invention will be described in detail.

The biocompatible material of the present invention is a synthetic polymer to be obtained from alkoxyalkyl (meth) acrylate using an anionic polymerization, which is represented by the general formula (1):

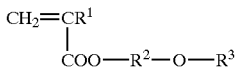

where $R^3O$— is an alkoxy group having 1 to 4 carbon numbers, such as a methoxy group, an ethoxy group, a propoxy group, a buthoxy group; —$R^2$— is an alkylene group having 1 to 4 carbon numbers, such as a methylene group, an ethylene group, a propylene group, a buthylene group; and $R^1$ is a hydrogen atom or a methyl group. Among the combinations thereof, specifically a methoxyethyl acrylate that has the combination of a methoxy group as $R^3O$—, an ethylene group as —$R^2$—, and a hydrogen atom as $R^1$ is preferable in terms of biocompatibility and economical efficiency.

In the case of so-called a water-insoluble polymer having a relatively high hydrophilicity, such as polyamide, polyimide, or polyurethane, the solubility of such a polymer to the blood depends essentially on its molecular weight alone. It can be dissolved in the blood when it is of a lower molecular weight. However, it becomes difficult to be dissolved as its molecular weight increases. If its molecular weight is larger than a predetermined level, it cannot be dissolved in the blood. Nevertheless, the so-called synthetic polymer is not a single material having a uniform molecular weight but a molecular aggregate with a wide molecular weight distribution ranging from lower to higher molecular weights. In general, therefore, the term "an average molecular weight" is conceptually used for the synthetic polymer. As a measure of the molecular weight distribution, a ratio (Mw/Mn) of dividing a weight-average molecular weight (Mw) by the number-average molecular weight (Mn) is used. It indicates that the ratio (Mw/Mn) becomes smaller as the value closes to 1. Therefore, as can be seen from the above description, the presence of a low molecular weight polymer component (i.e., molecular weight distribution) in the polymer plays an important role in addition to the average molecular weight.

Polyalkoxyalkyl (meth)acrylates provided as biocompatible materials put in to the practical use up to now have been synthesized by means of radical polymerization. The ratio (Mw/Mn) is relatively large because it takes a value of 2 to 3. Thus, a water-soluble low molecular weight polymer component is removed by repeating the re-precipitation to make it into an essentially water-insoluble polymer to avoid the elution to the blood. However, such a purification process extremely drives up the cost of the resulting biocompatible material.

On the basis of the above problems, the present inventors have been dedicated to their studies and finally found the following fact to complete the present invention. That is, in the process of preparing an alkoxyalkyl (meth)acrylate based biocompatible material, an anionic polymerization adopted to perform synthesizing can be used as means for simultaneously overcoming the elution of components into the blood and attaining the simplification of the purification procedure. Using such an anionic polymerization, a polymer having a certain molecular distribution and a certain weight-average molecular weight can be obtained as a polyalkoxyalkyl (meth)acrylate with a high biocompatibility.

According to the present invention, the ratio (Mw/Mn) of a weight-average molecular weight (Mw) to a number-average molecular weight (Mn) of the biocompatible material prepared by polymerizing monomers represented by the general formula (1) is in the range of 1.0 to 1.5. Preferably, the ratio (Mw/Mn) is in the range of 1.0 to 1.3. If the ratio (Mw/Mn) is more than 1.5, the percentage of low molecular weight polymer components in the total amount of the polymer increases. Consequently, the increasing the water-solubility of the polymer gives rise to the possibility of elution to the blood.

The extent of the molecular weight distribution increases as the value of the ratio (Mw/Mn) increases. In other words, it indicates that there are a lot of polymers having their respective molecular weights lower and higher than the molecular weight to be represented as the average molecular weight. Thus, even if the weight-average molecular weight is extremely large, it means that a sufficient quantity of the lower molecular weight polymer components is present when the ratio (Mw/Mn) is large, so that such a fraction can be eluted into the blood.

For finding the ratio (Mw/Mn) of a weight-average molecular weight (Mw) to a number-average molecular weight (Mn), methods of calculating the weight-average molecular weight (Mw) and the number-average molecular weight (Mn) may be those generally used in the measurement of molecular weight (M) of a macro molecular material. Such methods include a light scattering method, a film osmotic pressure method, a vapor osmotic pressure method, a viscometry method, a gel-permeation chromatography (GPC) method, and so on. Among them, the GPC method is preferable. The GPC method employs a sort of filtration effects. That is, a carrier such as a polystyrene gel having narrow pores is stuck into a column, followed by running a polymer solution through the column. In this case, the difficulty of passing through the narrow pore increases as the size of the molecule increases. Thus, the time required for the polymer passing through the column decreases while the size of the molecule increases. That it, there is a correspondence between the time required for the polymer passing through the column and the molecular weight of the polymer. In general, the elusion volume "$V_e$" of the molecule is detected successively by a differential refractometer. In the GPC method, therefore, the molecular weight of an unknown sample can be estimated with reference to a calibration curve of log M–$V_e$ prepared using a standard sample with a small molecular weight distribution. In the present invention, polystyrene is preferably used as such a standard sample. Therefore, in this invention the ratio (Mw/Mn) of a weight-average molecular weight (Mw) to a number-average molecular weight (Mn) generally refers to a value in terms of polystyrene (i.e., a polystyrene-converted value) in the GPC method.

In the present invention, with respect to the molecular weight of the polymer to be obtained by polymerization, the weight-average molecular weight (Mw) is 40,000 or more. If it is less than 40,000, the molecular weight is too small so that a part of the polymer may elute into the blood. On the other hand, in the case of high molecular weight, although there is no theoretically limitation from the viewpoint of blood compatibility and elution to the blood, the upper limit of the molecular weight may be approximately 200,000 as a rough estimation. If it is more than 200,000, a problem may arise with respect to cost or difficulty in synthesis. That is, the need of properly purifying and dewatering the monomer and the solvent in addition to the need of critically adjusting the polymerization condition, makes a higher molecular weight unfavorable with respect to the cost.

In the present invention, therefore, it is preferable that the weight-average molecular weight (Mw) is represented as a value in term of polystyrene (i.e., a polystyrene-converted value) in the GPC method, just as in the case with the ratio (Mw/Mn) of the weight-average molecular weight (Mw) to the number-average molecular weight (Mn) described above.

The biocompatible material of the present invention is generally used in the form of a homopolymer composed of a series of identical monomers represented by the general formula (1), that is a polymer represented by the general formula (3):

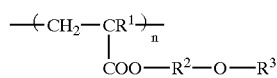

(3)

where
R$^3$O— is an alkoxy group having 1 to 4 carbon numbers, such as a methoxy group, an ethoxy group, a propoxy group, a buthoxy group; —R$^2$— is an alkylene group having 1 to 4 carbon numbers, such as a methylene group, an ethylene group, a propylene group, a buthylene group; and R$^1$ is a hydrogen atom or a methyl group; and n is generally 170–1600, more generally 300–1600. For improving the physical properties of the polymer to be obtained, the biocompatible material may be provided as a copolymer with other monomers. The copolymerizable monomers include, for example, unsaturated hydrocarbons capable of anionic polymerization, such as styrene, butadiene, and isoprene; and (meth)acrylate based monomers capable of anionic polymerization including (meth)acrylic esters such as methyl acrylate, ethyl acrylate, and butyl acrylate, hexyl acrylate, 2-ethyl hexyl acrylate, methyl methacrylate, ethyl methacrylate, and butyl methacrylate, hexyl methacrylate, 2-ethyl hexyl methacrylate.

Any pattern of copolymerization can be used, for example, random polymerization, block copolymerization, or graft copolymerization. Comonomers in these copolymerization patterns can be used within the scope of impairing the biocompatibility of the polymer to be obtained. Specifically, said comonomers can be used in the ratio of 40 mol % or less of whole polymer, preferably 10 mol % or less, more preferably 5 mol % or less.

In the present invention, the biocompatible material is obtained by subjecting monomers represented by the general formula (1) to an anionic polymerization. The anionic polymerization is capable of adjusting the molecular weight of the polymer to be obtained more easily than the radical polymerization. Therefore, it is suitable for obtaining the biocompatible material of the present invention in which the ratio (Mw/Mn) and the weight-average molecular weight in terms of polystyrene (i.e., polystyrene-converted values) in the GPC method should be exactly adjusted. Also, compared to the radical polymerization, in the anionic polymerization, some side reaction except for polymerization-propagating reaction, such as a chain transfer reaction or a disproportionation are hard to take place, whereby an amount of low molecular weight fraction that is mainly generated by the side reaction is little, so that it is favorable to obtain the desired polymer wherein the ratio (Mw/Mn) of a weight-average molecular weight (Mw) to a number-average molecular weight (Mn) is closer to 1.

In the present invention, it is preferable to execute the anionic polymerization for synthesizing the biocompatible material under the conditions that allow a quick execution of a polymerization initiation reaction to obtain the desired polymer with a small extent of molecular weight distribution.

In the present invention, the conditions that allow a quick execution of a polymerization initiation reaction and inhibit any side reaction except a polymerization-propagating reaction are described below in detail. Among the conditions described below, it is preferable that the anionic polymerization proceeds in a polymerization system in the presence of a tertiary organic aluminum compound composed of a structure represented by the following general formula (2):

(2)

where Ar is an aromatic ring.

If an anion polymerization initiation reaction is executed quickly, the dispersion in the initiations in the system proceeds uniformly. And more, if any side reaction except a polymerization-propagating reaction is inhibited, a contamination of low molecular weight fractions wherein are generated by deactivation of the polymerization reaction is decreased. By setting the conditions described above, a molecular weight distribution of obtained polymer, that is the ratio (Mw/Mn) of a weight-average molecular weight (Mw) to a number-average molecular weight (Mn) is closer to 1.

In the present invention, a polymerization initiator to be used in the anionic polymerization can be any anionic polymerization initiator known in the art, such as one of organometallic compounds that include, for example, primary organolithium compounds such as methyl lithium, ethyl lithium, and n-butyl lithium; secondary organolithium compounds such as sec-butyl lithium, diphenylmethyl lithium, and fluorenyl lithium; tertiary organolithium compounds such as tert-butyl lithium, 1,1-diphenylhexyl lithium, 1,1-diphenyl-3-methyl lithium, and triphenylmethyl lithium; organopotassium compounds such as diphenylmethyl potassium, and triphenylmethyl potassium; and lithium enolate compounds such as α-lithium ethyl isobutylate. In addition, the candidates may also include organic dilithium compounds such as tetra-α-methylstyrene lithium, 1,3-bis(1-lithio-1,3-dimethylpentyl) benzene, and 1,3-bis(1-lithio-1-phenyl-3-methylpentyl) benzene. Further including are high molecular weight organometalic compounds, each of which is obtained by combining an alkali metal on the polymerization-propagating end of the polymer obtained by anionic polymerization of anionic polymerization monomers such as polystyryl lithium, poly-α-methylstyryl lithium, polybutadienyl lithium, polyisoprenyl lithium, or the like. Still further including are metallic sodium, sodium alkoxide, potassium alkoxide, alkyl aluminum compound, alkoxyalkyl aluminum, alkyl Grignard reagent, and so on.

Among the anionic polymerization initiators, sec-butyl lithium is preferably used in the present invention because it shows a high efficiency of initiating the polymerization, availability, excellent living property, easiness of getting and handling, and so on.

In the present invention, the molecular weight of the polymer can be controlled on the basis of the usage amount of the initiator for anionic polymerization. In this case, the usage amount of the initiator for anionic polymerization can be determined in consideration of the molecular weight of the obtained polymer, the amount of monomers to be used for the polymerization, and the efficiency of the initiator.

The anionic polymerization of the present invention is designed to obtain a polymer with a small extent of molecular weight distribution, so that it is preferable that the polymerization conditions may be of hardly causing any side reaction except a polymerization-propagating reaction during the polymerization reaction.

Therefore, it is preferable that the anionic polymerization proceeds in a polymerization system in the presence of a tertiary organic aluminum compound composed of a structure represented by the following general formula (2):

Al—O—Ar     (2)

where Ar is an aromatic ring.

The tertiary organic aluminum compound represented by the general formula (2) may be one appropriately selected depending on the type of monomers to be used in the anionic polymerization, and so on. Preferably, the tertiary organic aluminum compound used may be an organic aluminum compound represented by the following general formula (4) from the viewpoint of a high rate of the polymerization, a high efficiency of initiating the polymerization, a wide range of useful polymerization initiators, inhibition of a side reaction during the polymerization reaction, alleviation of the cooling condition at the time of the polymerization, and so on.

AlR$^4$R$^5$R$^6$     (4)

where R$^4$ is a monovalent saturated hydrocarbon group which may have a substituent, a monovalent aromatic hydrocarbon group which may have a substituent, an alkoxy group which may have a substituent, an aryloxy group which may have a substituent, or an N, N-disubstituted amino group; and R$^5$ and R$^6$ are independently aryloxy groups which may have a substituent or are combined to form an arylenedioxy group which may have a substituent.

In the above general formula (4), if each of R$^4$, R$^5$, and R$^6$ can be represented, the examples of an aryloxy group which may have a substituent include a phenoxy group, a 2-methyl phenoxy group, a 4-methyl phenoxy group, a 2,6-dimethyl phenoxy group, a 2,4-di-t-butyl phenoxy group, a 2,6-di-t-butyl phenoxy group, a 2,6-di-t-butyl-4-methyl phenoxy group, a 2,6-di-t-butyl-4-ethyl phenoxy group, a 2,6-diphenyl phenoxy group, a 1-naphthoxy group, a 2-naphthoxy group, a 9-phenanthryloxy group, a 1-pireryl oxy group, and a 7-methoxy-2-naptoxy group.

The examples of an arylenedioxy group which may have a substituent, represented by the combination of R$^5$ and R$^6$, include any group in which hydrogen atoms in two phenolic hydroxy groups are removed from 2,2'-biphenol, 2,2'-methylene bis-phenol, 2,2'-methylene bis(4-methyl-6-t-butylphenol), (R)-(+)-1,1'-bi-2-naphthol, (S)-(−)-1,1'-bi-2-naphthol, or the like.

For the aryloxy group which may have a substituent and the arylenedioxy group which may have a substituent, if each of them has one or more substituents, the substituent may be an alkoxy group such as a methoxy group, an ethoxy group, an isopropoxy group, or a t-butoxy group; or a halogen atom such as chlorine or bromine.

If R$^4$ is a monovalent saturated hydrocarbon group which may have a substituent, as an instance, it may be an alkyl group such as a methyl group, an ethyl group, an n-propyl group, an isopropyl group, an n-butyl group, an isobutyl group, a sec-butyl group, a t-butyl group, a 2-methylbutyl group, 3-methylbutyl group, a n-octyl group, or a 2-ethylhexyl group; an cycloalkyl group such as a cyclohexyl group; or the like.

If R$^4$ is a monovalent aromatic hydrocarbon group which may have a substituent, as an instance, it may be an aryl group such as a phenyl group; an aralkyl group such as a benzyl group; or the like. If R$^4$ is an alkoxy group which may have a substituent, as an instance, it may be a methoxy group, an ethoxy group, an isopropoxy group, a t-butoxy group, or the like. If R$^4$ is a N,N-disubstituted amino group, as an instance, it may be a dialkylamino group such as a dimethylamino group, a diethylamino group, or a di-isopropyl amino group; a bis(trimethylsilyl) amino group; or the like. Substituents which may be included in those each of monovalent saturated hydrocarbon group, monovalent aromatic hydrocarbon group, alkoxy groups, and N,N-disubstituted amino group may be, for example, an alkoxy group; halogen atoms such as chlorine and bromide; and so on.

Furthermore, R$^4$, R$^5$, and R$^6$ in the above general formula (4), respectively, may be of the same chemical structure or of different chemical structure if they are within the range of the above definitions.

The exemplified organoaluminum compounds represented by the above general formula (4) include: methyl bis(2,6-di-t-butyl-4-methylphenoxy) aluminum, methyl bis(2,6-di-t-butylphenoxy) aluminum, methyl[2,2'-methylene bis(4-methyl-6-t-butylphenoxy)] aluminum, ethyl bis(2,6-di-t-butyl-4-methylphenoxy) aluminum, ethyl bis(2,6-di-t-butylphenoxy) aluminum, ethyl [2,2'-methylene bis(4-methyl-6-t-butylphenoxy)] aluminum, isobutyl bis(2,6-di-t-butyl-4-methylphenoxy) aluminum, isobutyl bis(2,6-di-t-butylphenoxy) aluminum, isobutyl [2,2'-methylene bis(4- methyl-6-t-butylphenoxy)] aluminum, n-octyl bis(2,6-di-t-butyl-4-methylphenoxy) aluminum, n-octyl bis(2,6-di-t-butylphenoxy) aluminum, n-octyl [2,2'-methylene bis(4-methyl-6-t-butylphenoxy)] aluminum, methoxy bis(2,6-di-t-butyl-4-methylphenoxy) aluminum, methoxy bis(2,6-di-t-butylphenoxy) aluminum, methoxy bis[2,2'-methylene bis(4-methyl-6-t-butylphenoxy)] aluminum, ethoxy bis(2,6-di-t-butyl-4-methylphenoxy) aluminum, ethoxy bis(2,6-di-t-butylphenoxy) aluminum, ethoxy bis[2,2'-methylene bis(4-methyl-6-t-butylphenoxy)] aluminum, isopropoxy bis(2,6-di-t-butyl-4-methylphenoxy) aluminum, isopropoxy bis(2,6-di-t-butylphenoxy) aluminum, isopropoxy bis[2,2'-methylene bis(4-methyl-6-t-butylphenoxy)] aluminum, t-butoxy bis(2,6-di-t-butyl-4-methylphenoxy) aluminum, t-butoxy bis(2,6-di-t-butylphenoxy) aluminum, t-butoxy bis [2,2'-methlene bis(4-methyl-6-t-butylphenoxy)aluminum, tris(2,6-di-t-butyl-4-methylphenoxy) aluminum, tris(2,6-diphenylphenoxy) aluminum, and so on.

Among these organoaluminum compounds, more specifically, isobutyl bis(2,6-di-t-butyl-4-methylphenoxy) aluminum, isobutyl bis(2,6-di-t-butylphenoxy) aluminum, isobutyl [2,2'-methylene bis(4-methyl-6-t-butylphenoxy)] aluminum, and so on are preferable in that each of them shows a high efficiency of initiating the polymerization, high living property, easiness of getting and handling, and so on.

The method for manufacturing the above organoaluminum compound is not specifically limited. For instance, it may be manufactured in accordance with any procedure known in the art.

In the present invention, a single organoaluminum compound may be used, or alternatively two or more different organoaluminum compounds may be used together.

The usage amount of the organoaluminum compound in the present invention may be appropriately selected, depending on the kind of polymerization operation, the kind of the solvent in the polymerization system if the solution polymerization is performed, other various conditions of polymerization, and so on. In general, the amount of the organoaluminum compound to be used in the present invention may be preferably in the range of 0.3 to 300 moles, more preferably in the range of 1 to 100 moles, for 1 mole of in the anionic polymerization initiator used.

In the present invention, for the purpose of inhibiting a side reaction caused in the anionic polymerization, or increasing the rate of polymerization, a polar compound may be present in the polymerization system. For example, the polar compound may be a tertiary amine compound such as trimethylamine, triethylamine, N,N,N',N'-tetramethylethylene diamine, N,N,N',N'-tetraethylethylene diamine, N,N,N',N'',N''-pentamethyldiethylene tetraamine N,N,N',N'',N''',N''''-hexyamethyltriethylene tetraamine, tris [2-(dimethylamino)ethyl]amine, 1,3,5-trimethylhexahydro-1,3,5-triazine, or 1,4,7-trimethyl-1,4,7-triazacyclononane; a nitrogen heterocycle aromatic compound such as 2,2'-bipyridyl, or 2,2':6', 2''-terpyridine; an ether compound such as dimethyl ether, diethyl ether, diisopropyl ether, dibutyl ether, anisole, diphenyl ether, 1,2-diphenoxyethane, 1,2-dimethoxyethane, 1,2-diethoxyethane, 1-ethoxy-2-methoxyethane, 1,2-diisopropoxyethane, 1,2-dibutoxyethane, 1,2-dimethoxypropane, 1,2-diethoxypropane, 1,2-diisopropoxypropane, 1,2-dibutoxypropane, 1,2-diphenoxypropane, 1,3-dimethoxypropane, 1,3-dietoxypropane, 1,3-diisopropoxypropane, 1,3-dibutoxypropane, 1,3-diphenoxypropane, 1,4-dimethoxybutane, 1,4-diethoxybutane, 1,4-diisopropoxybutane, 1,4-dibutoxybutane, 1,4-diphenoxybutane, diethylene glycol dimethyl ether, dipropylene glycol dimethyl ether, dibutylene glycol dimethyl ether, diethylene glycol diethyl ether, dipropylene glycol ether, dibutylene glycol diethyl ether, 12-crown-4, 15-crown-5, or 18-crown-6; an ester compound such as methyl pivalate, dimethyl phtalate, or the like; a quaternary ammonium salt compound such as tetramethylammonium chloride, tetramethylammonium bromide, tetrabutylammonium chloride, tetraoctylammonium chloride, or tetrabutylphosphonyl bromide. Among them, diethyl ether, 1,2-dimethoxyethane, N,N,N'N'-tetramethylethylenediamine, N,N,N',N'',N''-pentamethyldiethylenetriamine, or N,N,N',N'',N''',N''''-hexamethyltriethylene tetramine may be preferable.

The usage amount of each of these polar compounds may be defined on the basis of the target rate of polymerization, the degree of side reaction at the time of polymerization, easiness of removing the polar compound from the polymer product, and so on. The under limit of the usage amount of the polar compound may be 0.1 times or more of moles with respect to the amount of the initiator for the anionic polymerization. The upper limit of the usage amount of the polar compound is not specifically limited. However, the amount above polar compound to be used may be approximately 90 wt. % with respect to the polymerization system.

A solvent to be used in the anionic polymerization of the present invention may be one of ordinary aprotic solvents, for example, including aromatic solvents such as toluene and xylene; ethers such as dimethyl ether, and 1,2-dimethoxyethane, dioxane; and so on. Among them, toluene is preferably used because of easiness of handling.

A polymerization temperature may be in the range of −100° C. to +70° C. However, it is preferable to use a lower temperature in order to obtain a polymer having a smaller extent of molecular weight distribution. In practice, therefore, the polymerization is performed at a temperature of −70° C. to +40° C. An extremely low temperature is economically unfavorable.

After the polymerization, a metallic compound of the polymerization initiator remains in the system. A method for removing such a metallic compound is not limited to a specific one, but one of ordinary methods can be used. For example, there is a method in which a polymerization solution is washed with water; an inorganic acid and an aqueous solution thereof, such as sulfuric acid, hydrochloric acid, or nitric acid; an organic acid and an aqueous solution thereof, such as citric acid, or acetic acid; or an alkaline aqueous solution such as potassium hydroxide, or another method using an adsorbent such as activated clay or ion exchange resin to remove the remaining metallic compound from the system.

Furthermore, the procedure for purifying the polymer that removes the solvent is not limited to a specific one. Any ordinary method may be used for the purification. For example, there is a method in which the polymer solution is directly condensed and dried to remove the solvent fraction, or another method in which the polymer solution is mixed with a solvent having a low solubility for the polymer, such as n-hexane or n-octane, followed by recovering as an insoluble material.

In the present invention, a ratio (Mw/Mn) of a weight-average molecular weight (Mw) to a number-average molecular weight (Mn) of 1.0 to 1.5 and a weight-average molecular weight (Mw) of 40,000 or more can be attained by only performing the anionic polymerization. According to the present invention, therefore, there is no need to perform the purification for removing a low molecular weight polymer component, which is an absolute must for the conventional one.

The biocompatible material of the present invention is an amorphous material having a low glass transition point, so that a sufficient mechanical strength cannot be attained when used alone. Therefore, when the biocompatible material of the present invention is used for providing a medical device with a blood compatibility, it is preferable to apply the procedures of coating it on the surface of such a device or polymer blending.

The biocompatible material of the present invention can be applied in very extensive use. For example, it can be used for an oxygenator, a plasma separation film, a catheter, an artificial kidney film, an artificial blood vessel, an adhesion prevention film, an artificial skin, a wound-covering material, an in-plant material, a substrate for drug-delivery system (DDS), or the like. Of those, the biological material of the present invention can be preferably used for the artificial lung film that is in contact with a large quantity of blood, or a wound-covering material or the in-plant material that is in contact with a tissue for a long time.

The biocompatible material of the present invention is applied on the surface of the oxygenator or the like because only the surface thereof is closely related with the biocompatibility. Therefore, the whole of the artificial lung film or the like can be produced using the biocompatible medical material of the present invention. Alternatively, the substrate of the oxygenator or the like may be manufactured using another material, followed by retaining the biocompatible medical material of the present invention only on the surface of the substrate. The latter case is more preferable because a material to be used for the substrate can be appropriately selected for satisfying required characteristics of the oxygenator or the like, such as a physical strength.

As for a method for retaining the biocompatible medical material of the present invention on the surface of the substrate, a coating method is the most general method. The coating can be performed, for example, by a method well known in the art, such as a dip method, a spray method, a flow coater method, or the like, using a solution of the polymer, followed by drying the polymer. A film thickness of the polymer is not specifically limited. However, it is preferably 10 μm or less. The substrate material may be, for example, a plastic material such as polyethylene, polypropylene, poly vinyl chloride, polyvinylidene chloride, polyvinylidene fluoride, polytetrafluoroethylene, polyolefin halide, polyethylene telephthalate, and polybutylene telephthalate, polycarbonate; a metallic material such as stainless steel, titanium, and titanium alloy; or a ceramic material such as hydroxyapatite, graphite, and titanium nitride.

A second embodiment of the present invention is a method for obtaining a polymer having a ratio (Mw/Mn) of a weight-average molecular weight (Mw) to a number-average molecular weight (Mn) of 1.0 to 1.5 and a weight-average molecular weight (Mw) of 40,000 or more, by means of anionic polymerization of monomers represented by the following general formula (1):

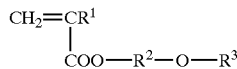
(1)

wherein $R^1$ is a hydrogen atom or a methyl group; $R^2$ is an alkylene group having 1 to 4 carbon numbers; and $R^3$ is an alkyl group having 1 to 4 carbon numbers.

For the monomer represented by the above general formula (1), particulars of the monomer such as the preferable ranges of $R^1$, $R^2$, and $R^3$ are just as described in the case of the first embodiment of the present invention. Also, the kind of the polymerization initiator for anionic polymerization, the amount thereof, another additive, and so on are also just as described in the case of the first embodiment of the present invention. Preferably, the anionic polymerization may be performed in the presence of the tertiary aluminum compound described above. In addition, the ratio (Mw/Mn) of a weight-average molecular weight (Mw) to a number-average molecular weight (Mn) and the weight-average molecular weight (Mw) are the same as those described in the first embodiment of the present invention.

A polymer obtained by the way of the present invention may be a homopolymer. For improving the physical properties of the polymer to be obtained, the polymer may be provided as a copolymer with other monomers. If the polymer is copolymer, comonomers as used and its ratio in the whole polymer are just as described in the case of the first embodiment of the present invention.

A third embodiment of the present invention is a polyalkoxyalkyl (meth)acrylate substantially free of a water-soluble component, which is polymerized by means of anionic polymerization. As described above, the water-soluble component in the polyalkoxyalkyl (meth)acrylate is a low molecular weight fraction contained in the polymer. Therefore, the polyalkoxyalkyl (meth)acrylate of the third embodiment of the present invention can be attained when the polymer obtained by the anionic polymerization is substantially free of the low molecular weight fraction. This kind of polyalkoxyalkyl (meth)acrylate is one having a the ratio (Mw/Mn) of a weight-average molecular weight (Mw) to a number-average molecular weight (Mn) of 1.0 to 1.5 and a weight-average molecular weight (Mw) of 40,000 or more, prepared by anionic polymerization of a series of identical monomers represented by the following general formula (1):

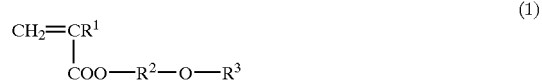

wherein $R^1$ is a hydrogen atom or a methyl group; $R^2$ is an alkylene group having 1 to 4 carbon numbers; and $R^3$ is an alkyl group having 1 to 4 carbon numbers.

With the anionic polymerization of the monomer described by the general formula (1), a polyalkoxy (meth) acrylate may be a homopolymer. For improving the physical properties of the polymer to be obtained, the polyalkoxy (meth)acrylate may be provided as a copolymer with other monomers.

For the monomer represented by the above general formula (1), particulars about the preferable ranges or the like of $R^1$, $R^2$, and $R^3$ are just as described in the case of the first embodiment of the present invention. Also, the kind of the polymerization initiator for anionic polymerization, the amount thereof, another additive, and so on are just as described in the case of the first embodiment of the present invention. Preferably, the anionic polymerization may be performed in the presence of the tertiary aluminum compound described above. In addition, the ratio (Mw/Mn) of a weight-average molecular weight (Mw) to a number-average molecular weight (Mn) and the weight-average molecular weight (Mw) are same as those described in the first embodiment of the present invention. And also, comonomers as used and its ratio in the whole polymer are just as described in the case of the first embodiment of the present invention.

A fact that the polyalkoxyalkyl (meth)acrylate of the third embodiment of the present invention is substantially free of a water-soluble component can be confirmed with an eluting rate. Specifically, the eluting rate is less than 0.01%, preferably less than 0.001%, which is obtained by dipping the polyalkoxyalkyl (meth)acrylate that has been coated on the surface of a glass dish into a phosphate buffer or the like and then dividing the difference the mass difference measured in a vacuum drying condition of the entire dish before and after dipping into the buffer by the mass before dipping into the buffer.

The polyalkoxyalkyl (meth)acrylate of the third embodiment of the present invention is substantially free of a water-soluble component, so it can be preferably used as a biocompatible material where the problem of eluting the water-soluble component into the blood is eluted.

The specific uses of polyalkoxyalkyl (meth)acrylate when it is provided as the biocompatible material includes those for the biocompatible material of the first embodiment of the present invention.

EXAMPLES

The details of the present invention will be further described by the aid of the following examples. However, the present invention is not limited to such examples.

Reagents used in the examples were purified as follows.

Toluene, diethyl ether, and 1,2-dimethoxyethane were refluxed by the application of heat overnight in the presence of sodium, respectively. Subsequently, each of them was distillated and was then dried on a molecular seive.

On the other hand, 2-metoxyethylacrylate and N,N,N'N",N"-pentamethyldiethylenetriamine were refluxed by the application of heat overnight in the presence of calcium hydride, respectively. Subsequently, each of them was distillated and was then dried on a molecular sieve.

Isobutyl bis(2,6-di-t-butyl-4-methylphenoxy) aluminum was purified by reacting with both triisobutylaluminum and 2,6-di-t-butyl-4-methylphenol, which are commercially available, and repeating the recrystallization of the resulting reaction product for several times.

Each of sec-butyl lithium and methanol used in the present invention was a commercially available reagent.

Furthermore, all of the procedures were performed under a nitrogen atmosphere. The molecular weight of the resulting polymer was measured using the GPC device and was then evaluated as an average molecular weight in terms of polystyrene (i.e., a polystyrene-converted value).

Example 1

100 ml of toluene was poured into a reactor composed of a 1 L three-necked flask with an agitating blade. Then, 2.5 ml of a 0.6 M isobutyl bis (2,6-di-t-butyl-4-methylphenoxy) aluminum/toluene solution and 0.16 ml of a 0.6 M sec-butyl lithium/cyclohexane solution were added into the reactor, followed by cooling down to a temperature of −40° C. Subsequently, 20 g of 2-methoxyethylacrylate was added into the reactor to allow the polymerization for two days. An active end of the polymer polymerized was deactivated by the addition of 0.05 ml of methanol. After that, the toluene solution was washed with diluted sulfuric acid to remove a metal derived from the catalyst and was then washed with distilled water, followed by dropping into hexane to obtain anionic polymerized polymethoxyethyl acrylate.

The resulting polymer had a weight-average molecular weight (Mw) of 124,000 and a ratio (Mw/Mn) of a weight-average molecular weight (Mw) to a number-average molecular weight (Mn) of 1.11.

60 mg of the present polymer was coated on the surface of a glass dish with a diameter of 8 cm. After evaporating a solvent, the dish was subjected to a vacuum drying, followed by measuring the weight of the dish. Then, 100 mL of a phosphate buffer at pH 7.4 was poured into the dish. Subsequently, the dish was mildly shaken to agitate the buffer for 24 hours at a room temperature. After removing the buffer form the dish, the dish was rinsed with distilled water and was then dried in a vacuum, followed by measuring the weight of the dish. The difference between the weights of the dish before and after subjecting to the addition of the phosphate buffer was calculated and was then divided by the weight of the dish before subjecting to the addition of the buffer to obtain a rate of eluting of the polymer component into the buffer. Consequently, the eluted component could not be detected. The weight-average molecular weight (Mw), the ratio (Mw/Mn) of a weight-average molecular weight (Mw) to a number-average molecular weight (Mn), and the eluting amount of the resulting polymer were listed in Table 1.

Example 2

A polymer was prepared just as in the case of Example 1, except for the following. In the present example, that is, 10 mL of diethyl ether was added before the addition of a 0.6 M isobutyl bis (2,6-di-t-butyl-4-ethylphenoxy) aluminum/toluene solution and the usage amount of a 1.3 M sec-butyllithium/cyclohexane solution was changed from 0.16 ml to 0.22 ml in addition to a change of the polymerization time from two days to eight hours. Under such conditions, the polymer was prepared.

The resulting polymer had a weight-average molecular weight (Mw) of 86,000 and a ratio (Mw/Mn) of a weight-average molecular weight (Mw) to a number-average molecular weight (Mn) of 1.09.

An elution test was conducted by the same procedure as that of Example 1 using the polymer. However, any eluted component could not be found. The weight-average molecular weight, the ratio (Mw/Mn) of a weight-average molecular weight (Mw) to a number-average molecular weight (Mn), and the eluting amount of the resulting polymer were listed in Table 1.

Example 3

A polymer was prepared just as in the case of Example 1, except for the following. In the present example, that is, 0.35 g of N,N,N',N",N"-pentamethyl ethlenetriamine was added before the addition of a 0.6 M isobutyl bis (2,6-di-t-butyl-4-ethylphenoxy) aluminum/toluene solution and the usage amount of a 1.3 M sec-butyllithium/cyclohexane solution was changed from 0.16 ml to 0.31 ml in addition to change the polymerization time from −40° C. and two days to 0° C. and eight hours. Under such conditions, the polymer was prepared.

The resulting polymer had a weight-average molecular weight (Mw) of 69,000 and a ratio (Mw/Mn) of a weight-average molecular weight (Mw) to a number-average molecular weight (Mn) of 1.17.

An elution test was conducted by the same procedure as that of Example 1 using the polymer. However, any eluted component could not be found. The weight-average molecular weight, the ratio (Mw/Mn) of a weight-average molecular weight (Mw) to a number-average molecular weight (Mn), and the eluting amount of the resulting polymer were listed in Table 1.

Example 4

A polymer was prepared just as in the case of Example 2, except for the following. In the present example, the usage amount of a 1.3 M sec-butyllithium/cyclohexane solution was changed from 0.22 ml to 0.45 ml. Under such conditions, the polymer was prepared.

The resulting polymer had a weight-average molecular weight (Mw) of 49,000 and a ratio (Mw/Mn) of a weight-average molecular weight (Mw) to a number-average molecular weight (Mn) of 1.12.

An elution test was conducted by the same procedure as that of Example 1 using the polymer. However, any eluted component could not be found. The weight-average molecular weight, the ratio (Mw/Mn) of a weight-average molecular weight (Mw) to a number-average molecular weight (Mn), and the eluting amount of the resulting polymer were listed in Table 1.

Comparative Example 1

A polymer was prepared just as in the case of Example 2, except for the following. In the present comparative example, the usage amount of a 1.3 M sec-butyllithium/cyclohexane solution was changed from 0.22 ml to 0.64 ml. Under such conditions, the polymer was prepared.

The resulting polymer had a weight-average molecular weight (Mw) of 35,000 and a ratio (Mw/Mn) of a weight-average molecular weight (Mw) to a number-average molecular weight (Mn) of 1.21.

An elution test was conducted by the same procedure as that of Example 1 using the polymer. However, a weight loss due to the elution was 24 wt %. The weight-average molecular weight, the ratio (Mw/Mn) of a weight-average molecular weight (Mw) to a number-average molecular weight (Mn), and the eluting amount of the resulting polymer were listed in Table 1.

TABLE 1

|  | Weight-average molecular weight (Mw) | Ratio of a weight-average molecular weight to a number-average molecular weight (Mw/Mn) | Eluting amount (wt %) |
| --- | --- | --- | --- |
| Example 1 | 124,000 | 1.11 | ND |
| Example 2 | 86,000 | 1.09 | ND |
| Example 3 | 69,000 | 1.17 | ND |
| Example 4 | 49,000 | 1.12 | ND |
| Comparative Example 1 | 35,000 | 1.21 | 24 wt % |

The weight-average molecular weight and the molecular weight dispersion are polystyrene-converted values measured by GPC using THF as an eluant.
ND: Not more than the limiting value of the measurement.

Comparative Example 2

10 g of methoxymethyl acrylate and 70 mg of azoisobutyronitrile (AIBN) were dissolved in 90 ml of toluene. After sufficient nitrogen substitution, the temperature of the reaction mixture was elevated to 80° C. and the mixture was then left to stand for one night to perform a radical polymerization. The resulting polymerization solution was poured into a large quantity of hexane to obtain polymethoxyethyl acrylate (PMEA). Then, the molecular weight and the molecular weight dispersion thereof were measured by GPC. The resulting polymer had a weight-average molecular weight (Mw) of 96,000 and a ratio (Mw/Mn) of a weight-average molecular weight (Mw) to a number-average molecular weight (Mn) of 2.21. An elution test was conducted by the same procedure as that of Example 1 using the polymer. However, a weight loss due to the elution was 15 wt %.

If polyalkoxyalkyl (meth) acrylate with a excellent blood compatibility is prepared by means of radical polymerization, a part of low molecular weight polymer component in the polymer is eluted into water. Therefore, when using as a biocompatible material, there is a need for a purification procedure to remove such a low molecular weight polymer component by a re-precipitation involving a high cost in consideration of safety. On the other hand, according to the present invention, the biocompatible material is prepared by means of anionic polymerization. The resulting material is a polyalkoxyalkyl (meth) acrylate which has a weight-average molecular weight (Mw) of 40,000 or more and a a ratio (Mw/Mn) of a weight-average molecular weight (Mw) to a number-average molecular weight (Mn) of 1.0 to 1.5 as polystyrene-converted values obtained by the GPC method, so that it includes no low molecular weight polymer component which may be water-soluble. Therefore, it is possible to eliminate the purification procedure, and obtain a resulting polymer substantially insoluble in water which can be provided at an extremely low cost.

What is claimed is:

1. A biocompatible material comprising a polymer synthesized from monomers by an anionic polymerization, wherein:

the polymer has a ratio (Mw/Mn) of a weight-average molecular weight (Mw) to a number-average molecular weight (Mn) in a range of 1.0 to 1.5, in which the weight-average molecular weight is 40,000 or more; and each of the monomers is represented by a following general formula (1):

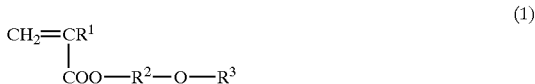

where $R^1$ is a hydrogen atom or a methyl group;

$R^2$ is a $C_1$–$C_4$ alkylene group; and $R^3$ is a $C_1$–$C_4$ alkyl group.

2. A biocompatible material according to claim 1, wherein the anionic polymerization proceeds in the presence of a tertiary aluminum compound having a structure represented by a following general formula (2):

where

Ar is an aromatic ring.

3. A biocompatible material according to claim 1, wherein $R^1$ is a hydrogen atom, $R^2$ is an ethylene group, and $R^3$ is a methyl group in the general formula (1).

4. A biocompatible material according to claim 2, wherein $R^1$ is a hydrogen atom, $R^2$ is an ethylene group, and $R^3$ is a methyl group in the general formula (1).

5. A method for obtaining a polymer, comprising performing an anionic polymerization of monomers to obtain a polymer having a ratio (Mw/Mn) of a weight-average molecular weight (Mw) to a number-average molecular weight (Mn) in a range of 1.0 to 1.5, in which the weight-average molecular weight is 40,000 or more, each of the monomers being represented by a following general formula (1):

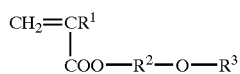
(1)
where
R¹ is a hydrogen atom or a methyl group; R² is a $C_1$–$C_4$ alkylene group; and R³ is a $C_1$–$C_4$ alkyl group.
6. A method for obtaining a polymer according to claim 5, wherein the anionic polymerization proceeds in the presence of a tertiary aluminum compound having a structure represented by a following general formula (2):
(2)
where
Ar is an aromatic ring.
\* \* \* \* \*

UNITED STATES PATENT AND TRADEMARK OFFICE
CERTIFICATE OF CORRECTION

PATENT NO. : 6,737,493 B2  Page 1 of 1
APPLICATION NO. : 10/131072
DATED : May 18, 2004
INVENTOR(S) : Akira Mochizuki et al.

It is certified that error appears in the above-identified patent and that said Letters Patent is hereby corrected as shown below:

References Cited

Foreign Patent Documents:

Add --JP 4-152952 A 5/1992--

Non-Patent Documents:

Add --T. MATSUDA et al., "Complement Activation on Polymer Surfaces and It's Effector Function to Immunocompetent Cells", *Jpn. The Journal of Artificial Organs,* (1987) 1045-1050, 16(2), Nihon Jinko Zoki Gakkai (Japanese Society for Artificial Organs and Tissues), Tokyo, Japan--

Signed and Sealed this

Fourteenth Day of October, 2008

JON W. DUDAS
*Director of the United States Patent and Trademark Office*